(12) United States Patent
Go et al.

(10) Patent No.: US 12,492,796 B2
(45) Date of Patent: Dec. 9, 2025

(54) ILLUMINATION DEVICE FOR A MOTOR VEHICLE HEADLIGHT AND MOTOR VEHICLE HEADLIGHT

(71) Applicant: ZKW Group GmbH, Wieselburg (AT)

(72) Inventors: Donghyun Go, Incheon (KR); Namseok Oh, Goyang-si (KR); Yongkyo Kim, Incheon-si (KR); Alexander Thomas Schager, Scheibbs (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/941,872

(22) Filed: Nov. 8, 2024

(65) Prior Publication Data

US 2025/0172268 A1    May 29, 2025

(30) Foreign Application Priority Data

Nov. 23, 2023   (EP) .................................... 23211767

(51) Int. Cl.
*F21S 41/32*      (2018.01)
*F21S 41/24*      (2018.01)
(Continued)

(52) U.S. Cl.
CPC ............. *F21S 41/322* (2018.01); *F21S 41/24* (2018.01); *F21S 41/43* (2018.01); *F21W 2102/15* (2018.01)

(58) Field of Classification Search
CPC .......... F21S 41/26; F21S 41/322; F21S 41/24; F21S 41/27
See application file for complete search history.

(56) References Cited

U.S. PATENT DOCUMENTS 11,867,371 B2 *  1/2024  Onoma ................ F21S 41/322
12,055,279 B2 *  8/2024  Suwa ........................ B60Q 1/16
(Continued)

FOREIGN PATENT DOCUMENTS

EP       3653926 A1     5/2020
WO    2023038010 A1     3/2023

OTHER PUBLICATIONS

Extended European Search Report for European Patent Application No. 23211767.1 dated Apr. 30, 2024 (5 Pages).

*Primary Examiner* — Matthew J. Peerce
(74) *Attorney, Agent, or Firm* — Eversheds Sutherland (US) LLP (57) ABSTRACT

An illumination device for a motor vehicle headlight for producing light distribution with a cut-off line. The device includes a light-permeable body, a light injection element and a light source, wherein the light injection element is designed to inject light emitted by the light source into the light-permeable body. The light injection element has a first deflection structure, which is configured such that light from the light source which enters the light injection element and strikes the deflection structure is totally reflected. The totally reflected light is directed at a second deflection structure which is arranged on an upper boundary surface of the light-guiding body and configured such that the light striking it is deflected to a first surface region of a first lower boundary surface of a screen device. The surface region deflects the light striking it into a region of the projection device, which projects the light as a sign light light beam into a region of the light distribution located above the cut-off line as additional light distribution, e.g., as sign light light distribution.

14 Claims, 7 Drawing Sheets

(51) Int. Cl.
*F21S 41/43* (2018.01)
*F21W 102/15* (2018.01)

(56) References Cited

U.S. PATENT DOCUMENTS

| | | |
|---|---|---|
| 2018/0058651 A1 | 3/2018 | Gromfeld |
| 2019/0017670 A1* | 1/2019 | Zhu ........................ F21S 41/24 |
| 2022/0390080 A1 | 12/2022 | Iwasaki |
| 2023/0258309 A1 | 8/2023 | Suwa et al. |

* cited by examiner

ILLUMINATION DEVICE FOR A MOTOR VEHICLE HEADLIGHT AND MOTOR VEHICLE HEADLIGHT

CROSS-REFERENCE TO RELATED APPLICATIONS

This application claims priority to European Patent Application No. 23211767.1, filed Nov. 23, 2023, which is incorporated herein by reference.

FIELD OF THE INVENTION

The invention relates to an illumination device for a motor vehicle headlight for producing a light distribution with a cut-off line, wherein the illumination device comprises: a light-permeable body, at least one light injection element, at least one light source associated with the at least one light injection element, wherein the at least one light injection element is designed to inject light emitted by the at least one light source into the light-permeable body, and a projection device, wherein the light injection element is configured to inject at least some of the light emitted by the at least one light source into the light-permeable body in such a way that it propagates in the light-permeable body as a first light beam substantially in a light propagation direction towards the projection device, and wherein the light-permeable body has a screen device with a screen edge, wherein the screen edge is arranged between the light injection element and the projection device as viewed in a light propagation direction, and wherein the first light beams is modified by the screen edge into a second light beam, which second light beams is projected by the projection device as the light distribution with a cut-off line, wherein the cut-off line, in particular the shape of the cut-off line, is formed by the screen edge, and wherein the screen edge is formed by a first lower boundary surface and a second lower boundary surface of the light-permeable body, with the lower boundary surfaces converging in a common edge, the screen edge. Furthermore, the invention relates to a motor vehicle headlight having at least one such illumination device.

BACKGROUND

Illumination devices described above are known from the prior art, in which sign light light distribution can also be produced by modifying the light-permeable body, the light injection element or the projection device in addition to front area light or dipped beam distribution with the at least one light source.

These modifications are often such that the part of the light emitted by the light source which without modification either remains unused or contributes to the front area light or dipped beam distribution, and which is used to produce the sign light light distribution, exits the light-permeable body before it is projected by the projection device as sign light light distribution, directly or after re-entering the light-permeable body.

However, it has turned out that the light exiting the light-permeable body can be difficult to control and often results in scattered light, which can lead to undesired optical effects.

SUMMARY OF THE INVENTION

It is an object of the invention to provide an illumination device with which a sign light light distribution can be produced in addition to a front area light or a dipped beam distribution and the aforementioned disadvantages do not occur.

This object is achieved with an illumination device described in the introduction by virtue of the fact that according to the invention, the light injection element has a first deflection structure, which is designed in such a way that light from the at least one light source which enters the light injection element and strikes the deflection structure is totally reflected in such a way that the totally reflected light is directed at a second deflection structure, wherein the second deflection structure is arranged on an upper boundary surface of the light-guiding body opposite the lower boundary surfaces, and wherein the second deflection structure is designed in such a way that the light striking it is deflected as a fourth light beam to a first surface region of the first lower boundary surface of the screen device, which first lower boundary surface is arranged downstream of the second boundary surface of the screen device as viewed in the light propagation direction, and wherein the surface region deflects the light striking it into a region of the projection device as a fifth light beam, which projects the light of the fifth light beam as a sign light light beam into a region of the light distribution located above the cut-off line as additional light distribution, for example as sign light light distribution.

Unlike existing solutions in which an optical path is produced outside the light-guiding body, the invention creates an optical path for generating the sign light exclusively within the light-guiding body, meaning that the described problems in the prior art, such as uncontrollable scattered light, which for example leads to an excessive amount of light in the region of the HV line, can be avoided.

The sign light light distribution can be simply controlled without any negative impact on the front area light or dipped beam distribution.

The use of three totally reflecting regions, which create the optical path of the light rays which generate sign light, also makes it possible to optimally adapt the generated sign light light distribution to the desired requirements by coordinating these three areas with each other, for example with regard to their distance, dimensions (size), shape, inclination, etc.

Advantageous embodiments of the invention are described in the dependent claims.

It may be provided that the first deflection structure comprises a deflection surface or is designed in the form of a deflection surface, wherein, for example, the deflection surface is designed as a flat surface or as a concavely curved surface.

A concave curvature can be used, for example, to generate a parallel beam, which strikes the second deflection structure on the upper boundary surface in a uniformly distributed manner, allowing for better control of the intensities.

It may further be provided that the second deflection structure is designed as a surface, in particular as a flat surface.

This allows a simple design, for example, as only the surface inclination needs to be designed, while the light preforming and quantity of light is ensured by the first deflection structure.

It may be provided that the first surface region of the first lower surface forms a straight intersection curve in vertical sections.

It may further be provided that the first surface region of the first lower surface forms curved intersection curves, in particular convex intersection curves, in horizontal sections.

These convex intersection curves preferably follow a Petzval surface or focal surface of the projection device.

Horizontal intersection curves are created by intersecting the respective surface with horizontal planes, vertical intersection curves are created by intersecting the respective surface with vertical planes, which run parallel to the optical axis of the illumination device or projection device or include the optical axis.

It is preferably provided that the first surface region is a boundary surface of a recess in the first lower boundary surface.

Below the first surface region, a third surface region of the first boundary surface adjoins it. Thanks to the formation of a recess, this second surface region is located such that no light reaches it from the second deflection structure. By using only one surface region which reflects light in the direction of the projection device, it becomes easier to control the production of the sign light light distribution.

Furthermore, it may advantageously be provided that the first surface region is spaced apart from the second boundary surface, and a further second surface region of the first boundary surface is arranged between the first surface region and the second boundary surface and connects the first surface region to the second boundary surface.

In this context, it may further be provided that the second surface region is arranged and designed in such a way that no light reaches the second surface region from the second deflection structure.

This second surface region, which, for example, forms a strip between the first surface region and the second boundary surface, can be used to create a dark strip in the light image between the cut-off line of the front area light or dipped beam distribution and the lower limit of the sign light light distribution.

It may further be provided that the second deflection structure is formed by a recess in the upper boundary surface.

This recess is formed by the, preferably flat, surface and possibly by a further boundary surface or further boundary surfaces which face(s) away from the light source and which no light generally strikes or which has/have no lighting function.

It may further be provided that the screen edge lies within or substantially within the Petzval surface or a focal surface of the projection device.

Finally, it may advantageously be provided that the at least one light injection element, the light-permeable body and the projection device are formed integrally from a light-permeable material and together form a body.

The light distribution with a cut-off line is preferably front area light distribution or dipped beam distribution.

BRIEF DESCRIPTION OF THE DRAWINGS

The invention is explained in more detail below based on the drawing.

DETAILED DESCRIPTION

Figure 1:
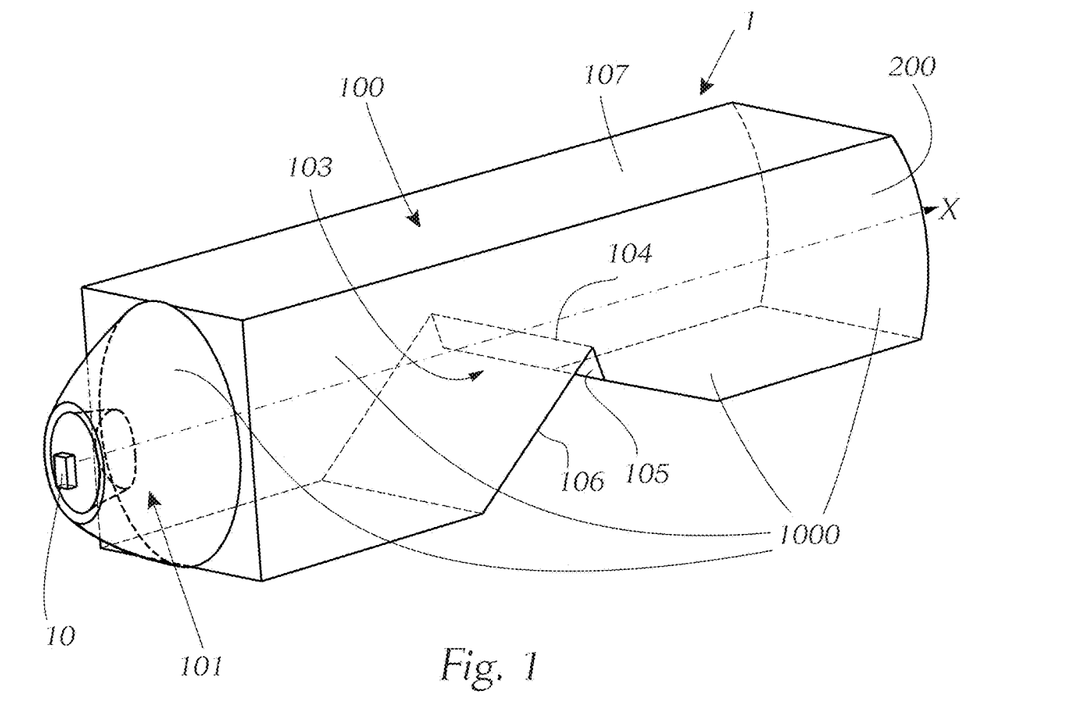
FIG. 1 shows an illumination device for a motor vehicle headlight according to the prior art in a perspective view from diagonally behind.
Figure 1A:
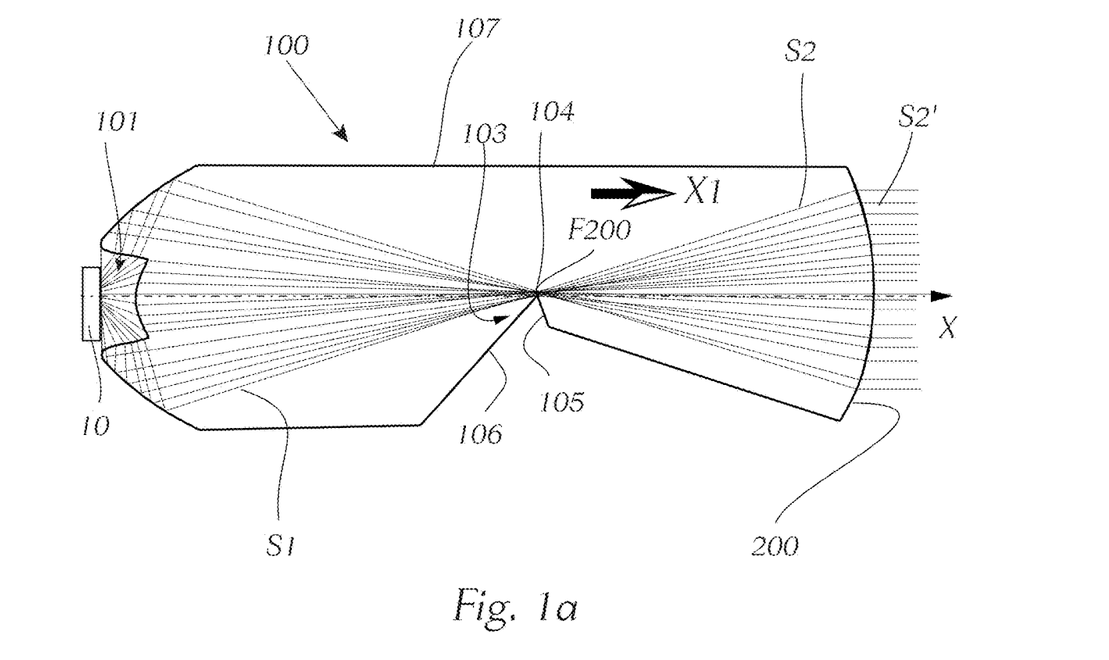
FIG. 1a shows the illumination device from FIG. 1 in a vertical section and an exemplary beam path of the light rays emitted by a light source.
Figure 2:
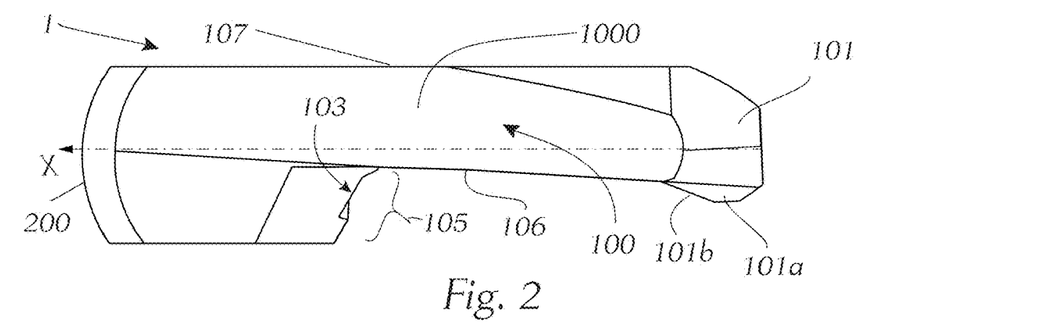
FIG. 2 shows an illumination device according to the invention in a side view.
Figure 2A:
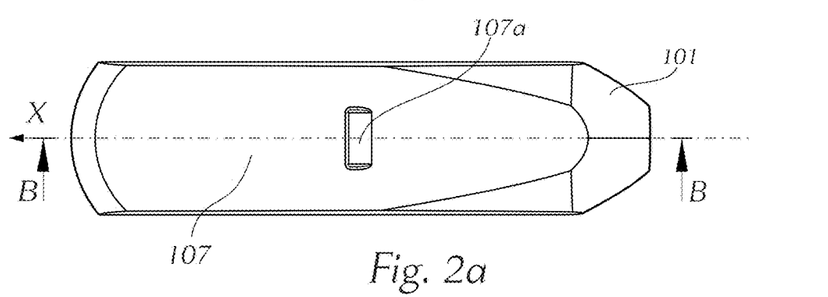
FIG. 2a shows the illumination device from FIG. 2 in a top view.
Figure 2B:
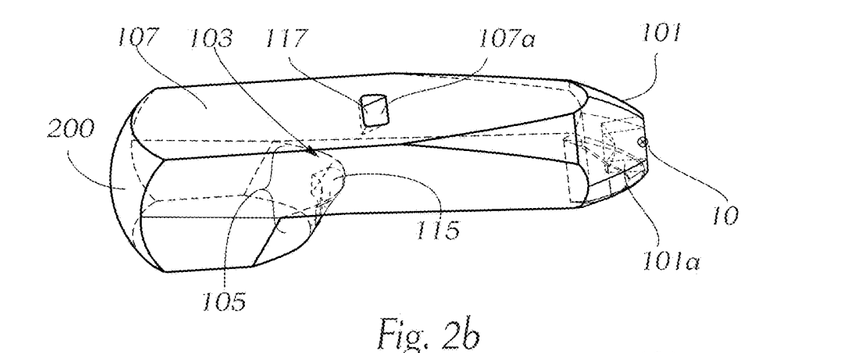
FIG. 2b shows the illumination device from FIG. 2 in a perspective view from diagonally above.
Figure 2C:
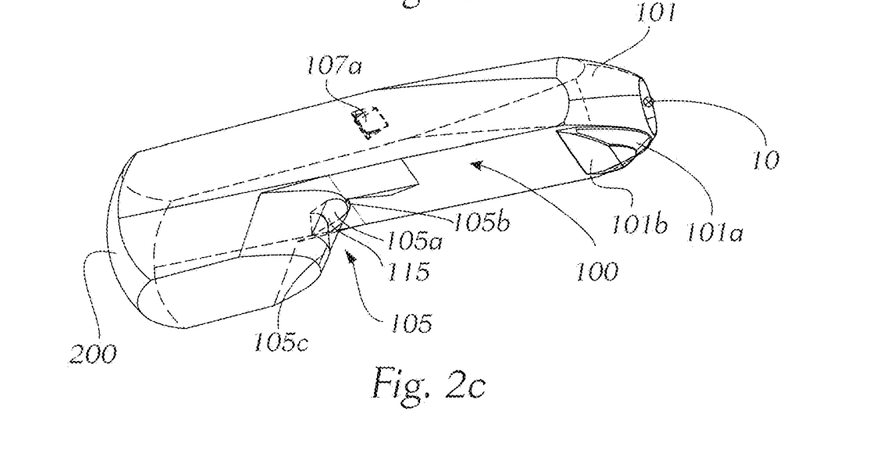
FIG. 2c shows the illumination device from FIG. 2 in a perspective view from diagonally below.

FIGS. 1 and 1a first of all show an illumination device 1 for a motor vehicle headlight according to the prior art for producing light distribution LV with a cut-off line HDG. This light distribution is, for example, a front area light or a dipped beam distribution.

The invention is based on such a known illumination device 1 from the prior art; as such, identical technical features of the illumination device according to the prior art and the illumination device according to the invention are designated with identical reference numerals.

The illumination device 1 comprises a light-permeable body 100, a light injection element 101, and a light source 10 associated with the at least one light injection element 101. The light emitted by the light source 10 is injected by the light injection element 101 into the light-permeable body 100 and propagates in the direction of a projection device 200 of the illumination device 1.

The light source 10 is, for example, one or more LEDs or the light source 10 comprises one or more LEDs.

The projection device 200 is, for example, located opposite the light injection element 101.

The light injection element 101 is designed to inject at least some of the light emitted by the light source 10 into the light-permeable body 100 in such a way that it propagates therein as a first light beam S1 towards the projection device 200.

The light-permeable body 100 has a screen device 103 with a screen edge 104, wherein the screen edge 104 is arranged between the light injection element 101 and the projection device 200 as viewed in a light propagation direction X1.

The first light beam S1 is modified by the screen edge 104 into a second light beam S2, which second light beam S2 is projected by the projection device 200 as the light distribution LV with a cut-off line HDG. The cut-off line HDG, in particular the shape of the cut-off line HDG, is determined by the screen edge 104.

The light rays of the light beam S2 are modified by the projection device 200 into light beam S2'.

The screen edge 104 is formed by a first lower boundary surface 105 and a second lower boundary surface 106 of the light-permeable body 100, which are opposite an upper boundary surface 107, with the lower boundary surfaces 105, 106 converging in a common edge, the screen edge 104.

The screen edge 104 lies within or substantially within the Petzval surface or a focal surface of the projection device 200.

It is preferably provided that the light injection element 101 forms the light, which is emitted by the light source and enters the light injection element, into the first light beam, wherein the light beam is preferably directed into a region, in particular into a region above, preferably just above the screen edge.

It may, in particular also in the case of the illumination device according to the invention, be provided in deviation from the schematic illustration of FIG. 1 that the screen edge is curved, in particular concavely curved, in a horizontal direction, and the screen edge preferably follows the focal point line of the projection device, wherein the screen edge preferably lies within or approximately within the Petzval surface of the projection device.

In terms of the wording that the screen edge lies within the Petzval surface, it should be noted that, to be precise, the relationships are as follows: the projection device has a focal point F200 which lies on the optical axis X of the projection device 200. The Petzval surface or focal point surface contains this focal point F200, just as a focal line runs through this focal point and lies within the Petzval surface.

The screen edge 104—regardless of whether it is a straight screen edge as shown in FIG. 1 or a curved edge as described above, for example, is now generally not exactly within the Petzval surface or focal point F200, but rather at a (small) distance above the focal point 200. Typically, the cut-off line HDG in the light image is lowered slightly below the horizontal 0°-0° line or below the horizon, usually by 0.573°. In order to achieve this in the light image, the screen edge 104 is located in the vertical direction slightly, in practice usually a few tenths of a millimetre, above the optical axis X of the projection device 200 or above the focal point F200.

It is preferably provided that the light injection element 101, the light-permeable body 100 and the projection device 200 are formed integrally from a light-permeable material and together form a body 1000.

Based on such an illumination device 1, and as shown in more detail in FIGS. 2, 2a-2c, 3, 3a, 3b and 4, 4a-4c, the light injection element 101 of an illumination device 1 according to the invention has a first deflection structure 101a, which is designed in such a way that light from the light source 10 which enters the light injection element 101 and strikes the deflection structure 101a is totally reflected in such a way that the totally reflected light S3 is directed at a second deflection structure 107a. The second deflection structure 107a is arranged on the upper boundary surface 107 of the light-guiding body 100 opposite the lower boundary surfaces 105, 106.

The light injection element 101, light-guiding body 100 and projection device 200 preferably form a continuous, single-piece body 1000. The transparent, light-permeable material which the individual elements, or in the case of the single-piece body 100 this body 1000 can be made of has a refractive index greater than that of air. The material contains, for example, PMMA (polymethyl methacrylate) or PC (polycarbonate) and is in particular preferably made thereof. However, the bodies can also be made of glass material, in particular inorganic glass material.

Figure 3:
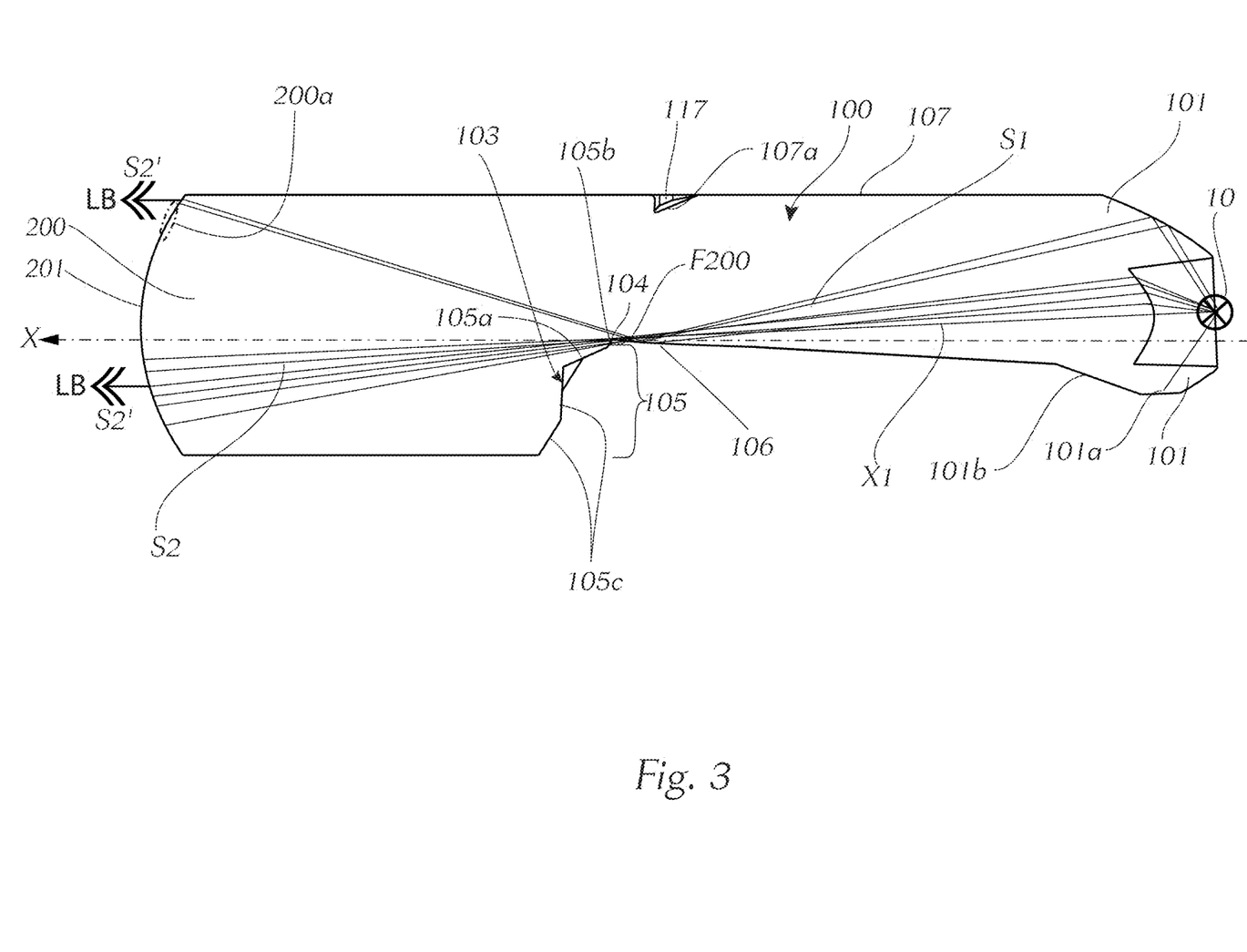
FIG. 3 shows a section through the illumination device according to the plane B-B from FIG. 2a with the schematic illustration of a beam path.
Figure 3A:
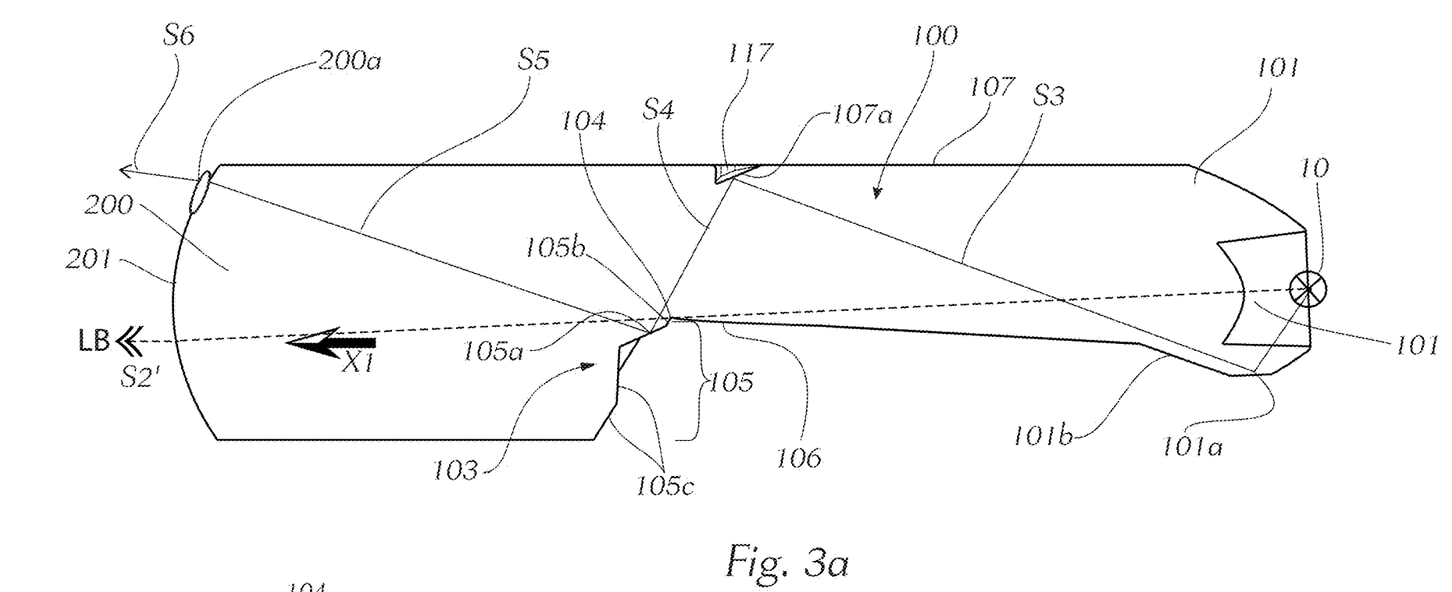
FIG. 3a shows the section from FIG. 3 with the schematic illustration of a further beam path.
Figure 3B:
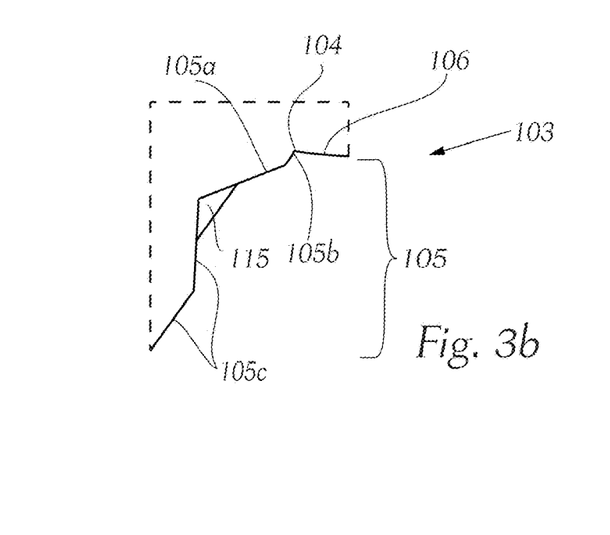
FIG. 3b shows a vertical section in the region of the screen device.

FIG. 3 again shows a beam path similar to FIG. 1a, i.e. the beam path of light rays which form the light distribution with a cut-off line HDG. According to the invention, as shown in FIG. 3a, some of the light rays emitted by the light source 10 and entering the light injection element 101 are used to form a sign light light distribution SV.

The second deflection structure 107a is designed in such a way that the light S3 striking it strikes a first surface region 105a of the first lower boundary surface 105. The first lower boundary surface 105 is that boundary surface which is arranged downstream of the second boundary surface 106, or rather the screen edge 104, as viewed in the light propagation direction.

The second deflection structure 107a deflects the incident light rays S3 as a fourth light beam S4 (or the incident light rays S3 are totally reflected at the deflection structure 107a).

The surface region 105a deflects the light striking it as a fifth light beam S5 into a region 200a of the projection device 200, specifically into a region 200a on the refractive light exit surface 201 of the projection device, which region 200a projects the light of the fifth light beam S5 as a sign light light beam S6 into a region B of the light distribution located above the cut-off line as additional light distribution, namely as sign light light distribution SV.

Figure 4:
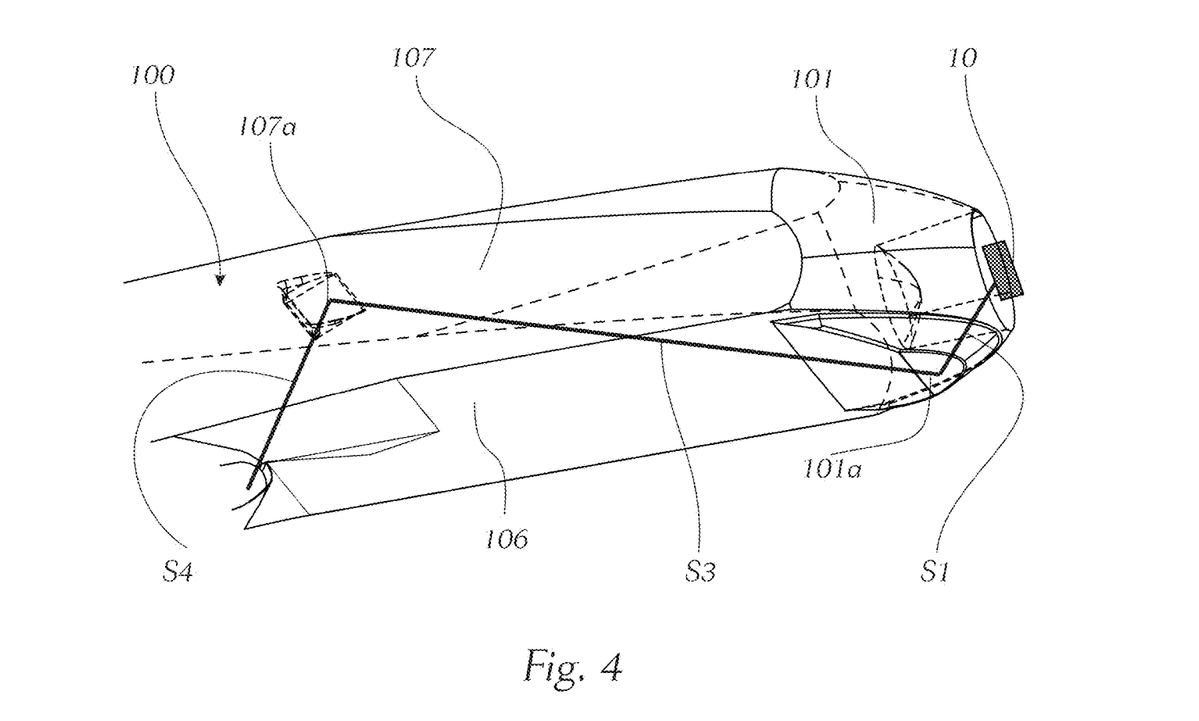
FIG. 4 shows a perspective view of the illumination device from FIG. 2 in the region of the light injection element with a first deflection structure.

The first deflection structure 101a is preferably, as shown, designed in the form of a deflection surface, wherein, for example, the deflection surface is a flat surface or preferably, a shown, a concavely curved surface.

A concave curvature can be used, for example, to generate a parallel beam, which strikes the second deflection structure 107a on the upper boundary surface 107 in a uniformly distributed manner, allowing for better control of the intensities.

Adjacent to the second deflection structure 101a in the transition to the light-guiding body 100 is a region 101b, which is optically inactive. This region 101b is preferably inclined with respect to the deflection structure 101a in such a way that the light rays S3 deflected by the first deflection structure 101a, in particular totally reflected, can propagate unobstructed in the direction of the second deflection structure 107a.

Figure 4A:
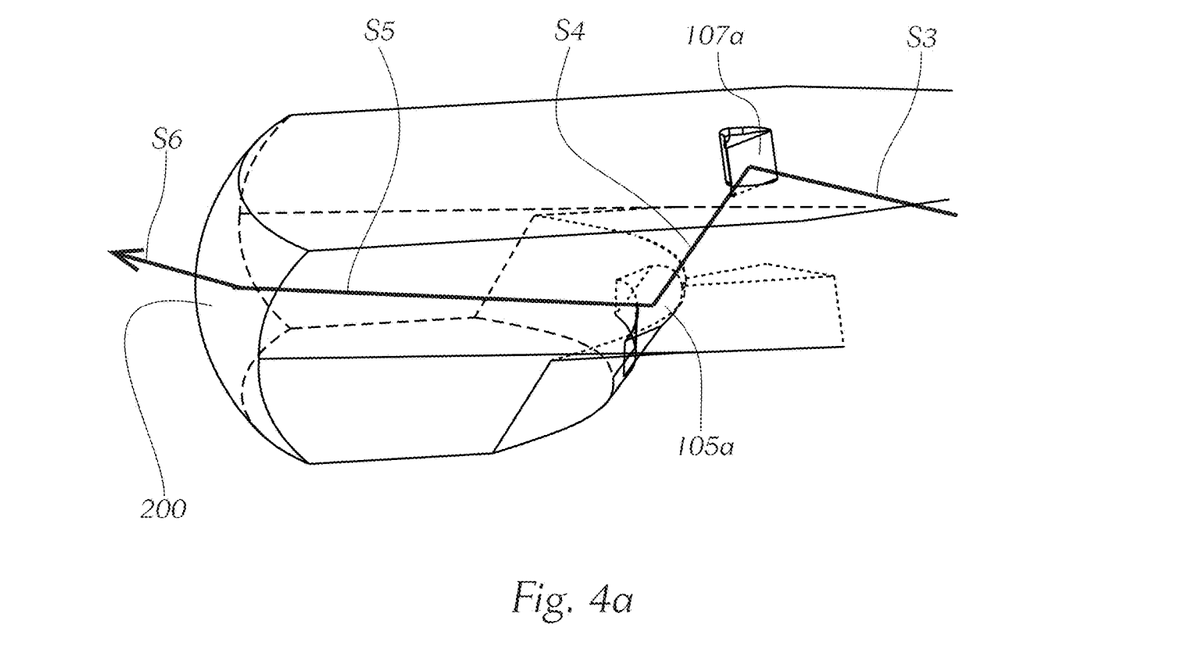
FIG. 4a shows a perspective view of the illumination device from FIG. 2 in the region of a second deflection structure.
Figure 4B:
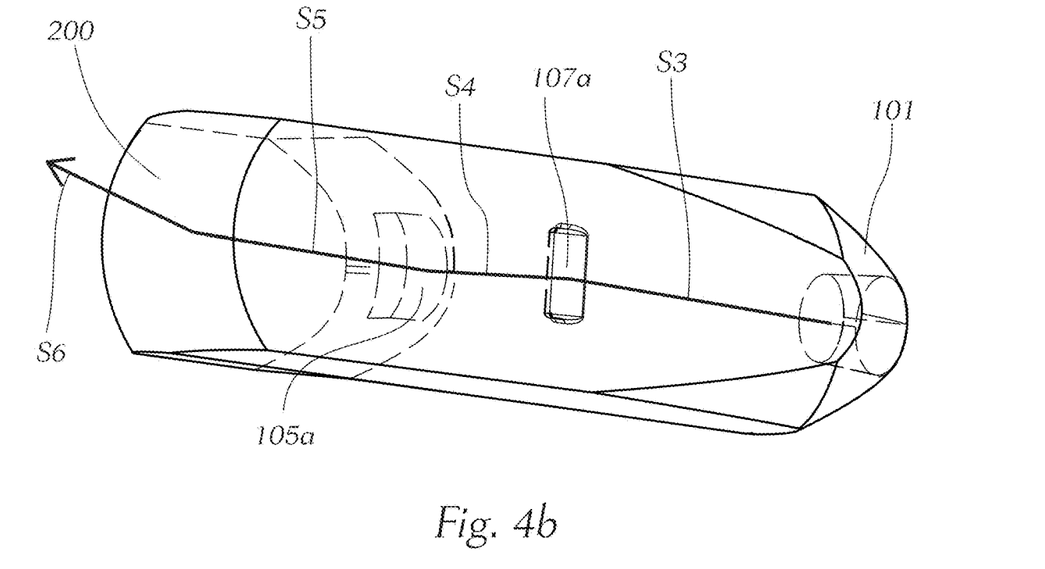
FIG. 4b shows a perspective view of the overall illumination device.

The second deflection structure 107a is preferably designed as a surface, in particular as a flat surface.

By way of example, the second deflection structure 107a is formed by a recess 117 in the upper boundary surface 107. This recess 117 is formed by the, preferably flat, surface 107a and possibly by a further boundary surface or further boundary surfaces which face(s) away from the light source 10 and which no light generally strikes or which has/have no lighting function.

Figure 4C:
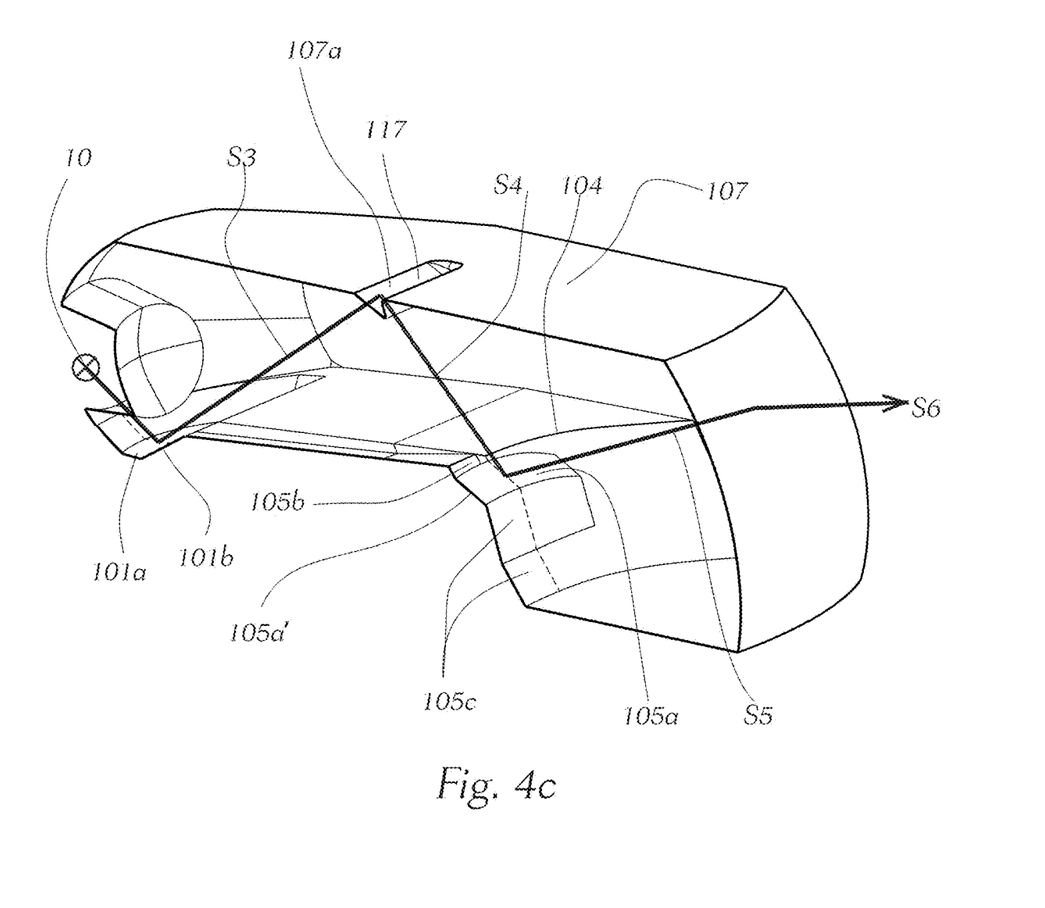
FIG. 4c shows a perspective view of the illumination device from FIG. 2 with a focus on the screen device.

The first surface region 105a of the first lower surface 105 is preferably designed, as shown in particular in FIG. 4c, in such a way that in vertical sections through the light-guiding body 100 in the region of the lower surface 105, intersection curves 105a' are created which are straight.

It may further be provided that the first surface region 105a of the first lower surface 105 forms curved intersection curves, in particular convex intersection curves, in horizontal sections. These convex intersection curves preferably follow a Petzval surface or focal surface of the projection device.

Horizontal intersection curves are created by intersecting the respective surface with horizontal planes, vertical intersection curves are created by intersecting the respective surface with vertical planes, which run parallel to the optical axis of the illumination device or projection device or include the optical axis.

The first surface region 105a forms a boundary surface of a recess 115 in the first lower boundary surface 105. Below the first surface region 105a, a third surface region 105c of the first boundary surface 105 adjoins it. Thanks to the formation of a recess 115, this second surface region 105c is located such that no light reaches it from the second deflection structure 107a. By using only one surface region 105a which reflects light in the direction of the projection device, it becomes easier to control the production of the sign light light distribution.

Furthermore, it may advantageously be provided that the first surface region 105a is spaced apart from the second boundary surface 106, and a further second surface region 105b of the first boundary surface 105 is arranged between the first surface region 105a and the second boundary surface 106 and connects the first surface region 105a to the second boundary surface 106. In this context, it is advantageous if the second surface region 105b is arranged and designed in such a way that no light reaches the second surface region 105b from the second deflection structure 107a.

This second surface region 105b, which, for example, forms a strip between the first surface region 105a and the second boundary surface 106, can be used to create a dark strip BAN in the light image between the cut-off line of the front area light or dipped beam distribution and the lower limit of the sign light light distribution.

Figure 5:
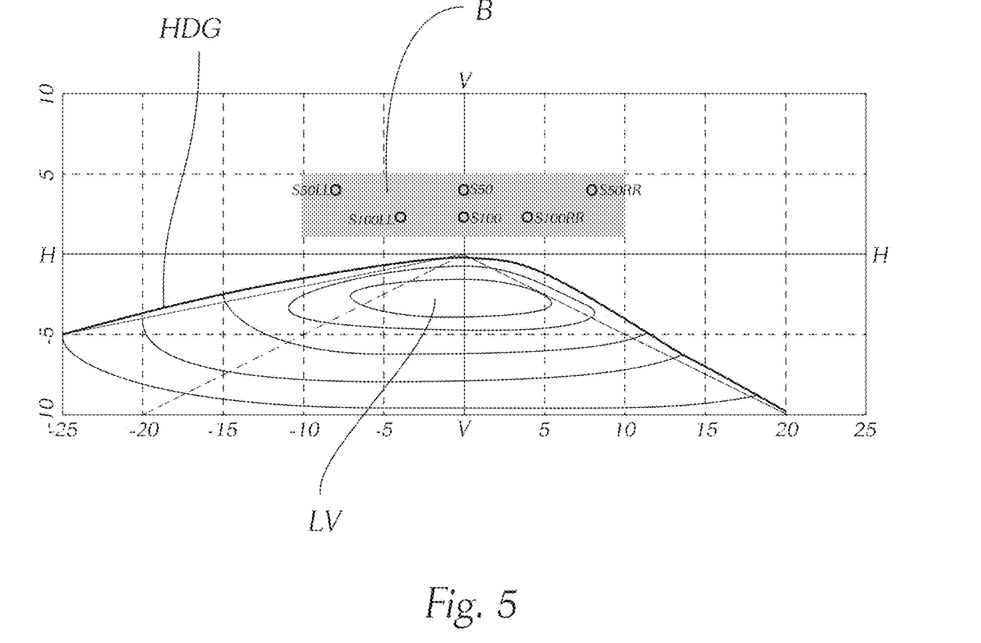
FIG. 5 schematically shows front area light distribution and relevant points of a sign light light distribution.

FIG. 5 shows light distribution LV in the form of a schematic front light distribution with a cut-off line HDG, as can be produced, for example, with an illumination device according to FIG. 1, but also with an illumination device 1 according to the present invention. FIG. 5 further shows a region B, in which a sign light light distribution SV is to be produced, as well as relevant measurement points for which—in this case according to the relevant ECE regulation—defined illuminance values must be adhered to.

Figure 6:
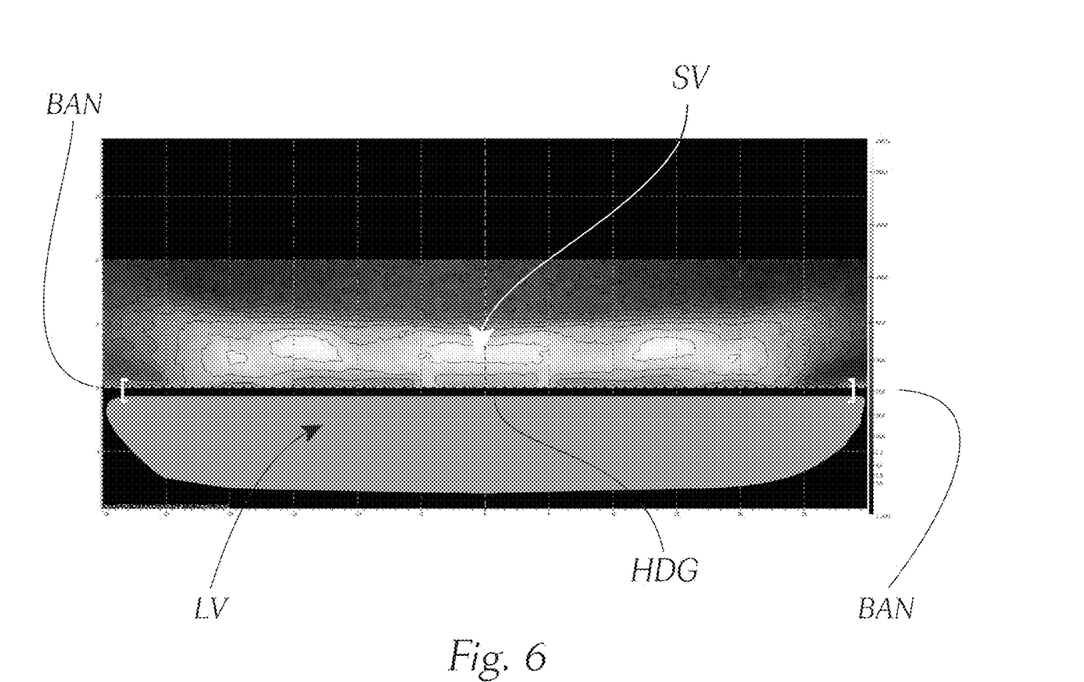
FIG. 6 shows a simulation of dipped beam distribution and sign light light distribution produced with an illumination device according to the invention.

FIG. 6 shows light distribution SV in the form of dipped beam distribution with a cut-off line HDG, and a sign light light distribution SV above it. As shown, there is a dark strip BAN between the cut-off line HDG and the lower boundary of the sign light light distribution SV, which, as described above in particular with reference to FIG. 4c, can be created thanks to the presence of the second surface region 105b.

The invention claimed is:

1. An illumination device (1) for a motor vehicle headlight for producing a light distribution (LV) with a cut-off line (HDG), the illumination device comprising:
    a light-permeable body (100);
    at least one light injection element (101);
    at least one light source (10) associated with the at least one light injection element (101), wherein the at least one light injection element (101) is designed to inject light emitted by the at least one light source (10) into the light-permeable body (100); and
    a projection device (200),
    wherein the light injection element (101) is configured to inject at least some of the light emitted by the at least one light source (10) into the light-permeable body (100) in such a way that it propagates in the light-permeable body (100) as a first light beam (S1) substantially in a light propagation direction towards the projection device (200),
    wherein the light-permeable body (100) has a screen device (103) with a screen edge (104), wherein the screen edge (104) is arranged between the light injection element (101) and the projection device (200) as viewed in a light propagation direction,
    wherein the screen edge (104) is formed by a first lower boundary surface (105) and a second lower boundary surface (106) of the light-permeable body (100), with the lower boundary surfaces (105, 106) converging in a common edge, the screen edge (104),
    wherein the light injection element (101) has a first deflection structure (101a), which is designed in such a way that light from the at least one light source (10) which enters the light injection element (101) and strikes the deflection structure (101a) is totally reflected in such a way that the totally reflected light (S3) is directed at a second deflection structure (107a),
    wherein the second deflection structure (107a) is arranged on an upper boundary surface (107) of the light-guiding body (100) opposite the lower boundary surfaces (105, 106), and wherein
    wherein the second deflection structure (107a) is designed in such a way that the light striking it is deflected as a fourth light beam (S4) to a first surface region (105a) of the first lower boundary surface (105) of the screen device (103), which first lower boundary surface (105) is arranged downstream of the second boundary surface (106) of the screen device (103) as viewed in the light propagation direction (X1), and
    wherein the surface region (105a) deflects the light striking it as a fifth light beam (S5) into a region (200a) of the projection device (200), which projects the light of the fifth light beam (S5) as a sign light light beam (S6) into a region (B) of the light distribution located above the cut-off line as additional light distribution.

2. The illumination device according to claim 1, wherein the first deflection structure (101a) comprises a deflection surface or is designed in the form of a deflection surface, wherein the deflection surface is designed as a flat surface or as a concavely curved surface.

3. The illumination device according to claim 1, wherein the second deflection structure (107a) is designed as a flat surface.

4. The illumination device according to claim 1, wherein the first surface region (105a) of the first lower surface (105) forms a straight intersection curve in vertical sections.

5. The illumination device according to claim 1, wherein the first surface region (105a) of the first lower surface (105) forms convex intersection curves in horizontal sections.

6. The illumination device according to claim 1, wherein the first surface region (105a) is a boundary surface of a recess (115) in the first lower boundary surface (105).

7. The illumination device according to claim 1, wherein the first surface region (105a) is spaced apart from the second boundary surface (106), and a further second surface region (105b) of the first boundary surface (105) is arranged between the first surface region (105a) and the second boundary surface (106) and connects the first surface region (105a) to the second boundary surface (106).

8. The illumination device according to claim 7, wherein the second surface region (105b) is arranged and designed in such a way that no light reaches the second surface region (105b) from the second deflection structure (107a).

9. The illumination device according to claim 1, wherein the second deflection structure (107a) is formed by a recess (117) in the upper boundary surface (107).

10. The illumination device according to claim 1, wherein the screen edge (104) lies within or substantially within the Petzval surface or a focal surface of the projection device (200).

11. The illumination device according to claim 1, wherein the at least one light injection element (101), the light-permeable body (100) and the projection device (200) are formed integrally from a light-permeable material and together form a body (1000).

12. The illumination device according to claim 1, wherein the light distribution (LV) with a cut-off line (HDG) is front area light distribution or dipped beam distribution.

13. A motor vehicle headlight having at least one illumination device according to claim 1.

14. The illumination device according to claim 1, wherein the additional light distribution above the cut-off line is a sign light light distribution (SV).

* * * * *